United States Patent [19]

Van Thillo et al.

[11] Patent Number: 5,494,738
[45] Date of Patent: Feb. 27, 1996

[54] SHEET OR WEB MATERIAL HAVING ANTISTATIC PROPERTIES

[75] Inventors: Etienne A. Van Thillo, Essen; Bavo A. Muys, Mortsel, both of Belgium

[73] Assignee: AGFA-Gevaert, N.V., Mortsel, Belgium

[21] Appl. No.: 658,587

[22] Filed: Feb. 21, 1991

[30] Foreign Application Priority Data

Mar. 1, 1990 [EP] European Pat. Off. ............ 90200482

[51] Int. Cl.$^6$ ............................................. B32B 5/16
[52] U.S. Cl. ........................... 428/331; 428/341; 428/342; 428/448; 428/480; 430/527; 430/536; 430/539
[58] Field of Search ................................. 428/331, 341, 428/342, 404, 480, 448, 537.5; 430/527, 536, 539

[56] References Cited

U.S. PATENT DOCUMENTS

| | | | |
|---|---|---|---|
| 4,173,480 | 11/1979 | Woodward | 430/536 |
| 5,006,451 | 4/1991 | Anderson | 430/527 |
| 5,008,178 | 4/1991 | Van Thillo | 428/331 X |

*Primary Examiner*—D. S. Nakarani
*Assistant Examiner*—H. Thi Lê
*Attorney, Agent, or Firm*—Breiner & Breiner

[57] ABSTRACT

A sheet or web material being a subbed or unsubbed hydrophobic resin support or paper support coated with at least one hydrophobic resin layer and having at least on one side thereof an antistatic layer containing for at least 70% by weight colloidal silica having an average particle size not larger than 10 nm and a surface area of at least 300 m$^2$ per gram, the colloidal silica being present in said antistatic layer at a coverage of at least 50 mg per m$^2$, characterized in that said antistatic layer is coated with a covering layer having a smaller sticking power to a gelatin layer than said silica containing layer, said covering layer containing at least 50% by weight of a water-insoluble synthetic polymer being applied at a dry coverage in the range of 0.01 to 2 g/m$^2$.

15 Claims, No Drawings

3,494,738

SHEET OR WEB MATERIAL HAVING ANTISTATIC PROPERTIES

DESCRIPTION

1. Field of the Invention

The present invention relates to a sheet or web material having antistatic properties, and is particularly but not exclusively concerned with recording materials wherein a hydrophobic resin support carries a transparent antistatic layer and a recording layer, e.g. a light-sensitive silver halide emulsion layer.

2. Background of the Invention

It is known that hydrophobic resin sheet and web materials of low conductivity readily become electrostatically charged by friction with dielectric materials and/or contact with electrostatically chargeable transport means, e.g. rollers. The charging occurs particularly easily in a relatively dry atmospheric environment.

Sheets and webs of hydrophobic resins, e.g. polyesters or cellulosetriacetate, are commonly used as support element of recording materials. Such materials are subjected to frictional contact with other elements during their manufacture, e.g. during a coating or cutting stage, and during use, e.g. during the recording of information, e.g. with a step-and-repeat or movie camera or—in the case of silver halide photographic materials—during image-processing or image projection.

Especially in the reeling-up or unreeling of dry photographic film in a camera or projector high friction may occur, resulting in electrostatic charges that may attract dust or cause sparking. In unprocessed photographic silver halide emulsion materials sparking causes developable fog and degrades the image quality.

In order to reduce electrostatic charging of sheet or web materials comprising a hydrophobic resin support coated with at least one silver halide emulsion layer without impairing their transparency it is known to incorporate ionic compounds in these materials, e.g. in the silver halide emulsion layer(s). In order to avoid diffusion of ionic compounds out of a silver halide emulsion layer during its different wet processing treatments, preference has been given to antistatic high molecular weight polymeric compounds having ionic groups at frequent intervals in the polymer chain [ref. Photographic Emulsion Chemistry, by G. F. Duffin,— The Focal Press—London and New York (1966)—Focal Press Ltd., p. 168].

From U.S. Pat. No. 3,525,621 it is known that antistatic properties can be given to an aqueous coating composition by practically any silica sol, but preferably a silica of large surface area of the order of 200–235 m² per gram in combination with an alkali metal salt of an alkylaryl polyethersulphonate. The applied alkali metal salt of an alkylaryl polyethersulphonate is a strongly watersoluble compound leaching out during photographic aqueous processing whereby the antistatic character of the substrate whereto the antistatic composition is applied markedly decreases so that no sufficient permanent antistatic character is retained after drying the processed material because the remaining colloidal silica itself fails in sufficiently lowering the surface resistivity.

According to published European patent application 0 334 400 A1 a sheet or web material is provided being a subbed or unsubbed hydrophobic resin support or paper support coated with at least one hydrophobic resin layer and having on at least one side thereof an outermost antistatic layer containing colloidal silica, characterised in that the antistatic layer is free from any cationic surfactant and consists for at least 70% by weight of colloidal silica having an average particle size not larger than 10 nm and a surface area of at least 300 m² per gram, the colloidal silica being present at a coverage of at least 50 mg per m².

Said antistatic layer retains a low surface resistivity after wet photographic processing and drying but has the disadvantage of sticking under mild pressure to hydrophilic colloid layers such as gelatin containing layers. Such causes damages to the antistatic layer when using said antistatic layer in photographic gelatin-silver halide emulsion layer materials in which the antistatic layer on storage or reeling up comes in contact with an outermost gelatin containing layer.

SUMMARY OF THE INVENTION

It is an object of the present invention to provide a sheet or web material which includes a hydrophobic resin support, e.g. polyethylene terephthalate resin support, or paper support coated with a hydrophobic resin layer carrying a transparent antistatic layer including colloidal silica as antistatic agent and a covering layer that prohibits sticking to a contacting gelatin containing layer and improves abrasion resistance.

It is a further object of the present invention to provide a said sheet or web material being a photographic gelatin-silver halide emulsion layer material wherein said covering layer serves as a subbing layer for a gelatin containing layer acting as anti-curling layer.

Other objects and advantages of the present invention will become clear from the further description and examples.

According to the present invention there is provided a sheet or web material being a subbed or unsubbed hydrophobic resin support or paper support coated with at least one hydrophobic resin layer and having at least on one side thereof an antistatic layer containing for at least 70% by weight colloidal silica having an average particle size not larger than 10 nm and a surface area of at least 300 m² per gram, the colloidal silica being present in said antistatic layer at a coverage of at least 50 mg per m², characterized in that said antistatic layer is coated with a covering layer having a smaller sticking power to a gelatin layer than said silica containing layer, said covering layer containing at least 50% by weight of a water-insoluble synthetic polymer being applied at a dry coverage in the range of 0.01 to 2 g/m², preferably in the range of 0.05 to 1 g/m².

The surface area of the colloidal silica is determined according to the BET-value method described by S. Brunauer, P. H. Emmett and E. Teller, J.Amer. Chem. Soc. 60, 309–312 (1938).

DETAILED DESCRIPTION OF THE INVENTION

Particularly low surface resistivity values are obtained by using an antistatic layer consisting for at least 80% by weight of colloidal silica having a surface area of 500 m² per gram and having an average grain size smaller than 7 nm. Such type of silica is sold under the name KIESELSOL 500 (KIESELSOL is a registered trade name of Farbenfabriken Bayer AG, Leverkusen, West-Germany).

The coverage of said colloidal silica in the antistatic layer is preferably in the range of 100 mg to 500 mg per m².

Anti-static layers on the basis of solely colloidal silica may show in dried state some micro-cracks that lower the lateral conductivity. Micro-cracking can be effectively counteracted by mixing the silica with synthetic hectorite clay. A synthetic hectorite clay is a magnesium silicate having a crystal lattice structure in which magnesium ions, optionally partially replaced by lithium ions and/or sodium ions, are bound in octahedral relationship with hydroxyl ions, some of which may be replaced by fluorine atoms as mentioned in U.S. Pat. No. 4,173,480. The use of synthetic hectorite as antistatic additive to a silica containing layer has been described in said U.S. patent document.

In an embodiment of the present invention the antistatic layer contains the synthetic hectorite in admixture with the colloidal silica in a weight ratio in the range of 1/20 to 1/4. Synthetic hectorite clay is sold under the trade name LAPONITE S by Laporte Industries Ltd. UK.

The coating of the above defined antistatic layer composition proceeds from an aqueous colloidal dispersion either or not in the presence of a surface-active agent.

According to an embodiment of the present invention the antistatic colloidal silica containing layer covered with a thin water-insoluble protective synthetic polymer layer contains at least one anionic and/or non-ionic surface-active agent that improves the spreading of the layer.

An anionic surface-active agent contains in its molecule a hydrophobic residue having non-dissociatively linked thereto an anionic part that is neutralized with a dissociative cation. Examples of suitable anionic surface active agents are alkylaryl polyether sulfonates described in U.S. Pat. No. 3,525,621 and the disodium salt of 2-heptadecyl-benzimidazole disulfonic acid sold under the trade name ULTRAVON W by Ciba A.G. Switzerland.

Non-ionic wetting agents suitable for use in the silica containing layer applied according to the present invention are e.g. a $C_{12}$-$C_{18}$ alkylphenol polyethyleneoxide ether such as dodecylphenol polyethylene oxide ether or saponine. It is clear that other surface-active agents may be used and that their favourable influence on reduction of surface resistivity can be checked by simple tests. A survey of surface-active agents is given e.g. in Tensid-Taschenbuch Herausgegeben Yon Dr. Helmut Stache—Carl Hanser Verlag München Wien (1979).

The weight ratio of colloidal silica to surface-active agent can vary widely, for example from about 5/1 to 200/1.

In the production of a suitable covering layer having poor sticking power to a gelatin containing layer preferably hydrophobic water-insoluble synthetic polymers having a glass transition temperature above 40° C. are used.

According to a first embodiment said polymers are applied as a coating from a solution in an organic solvent or mixture of organic solvents. Examples of such polymers are: polymethylmethacrylate, polyisobutylmethacrylate, polycarbonate, mixed polyester-carbonates and polycarbonate/polystyrene blends that can be dissolved in acetone, methoxy-1-propanol-2, methyl isobutyl ketone and the like.

According to a second embodiment the water-insoluble polymers are coated from an aqueous dispersion, i.e. as a latex. Examples of particularly suitable latex polymers are copolymers of vinylidene chloride, e.g. copolymers of vinylidene chloride with acrylic monomers and minor amounts of vinyl monomers containing carboxylic acid groups, e.g. acrylic acid and/or iraconic acid monomers.

Specific examples of copolymers of vinylidene chloride, methyl acrylate and itaconic acid that can be applied according to the present invention are described for use in plural subbing coatings in U.S. Pat. No. 3,649,336. The latex coated layer may contain colloidal silica improving the adherence to the silica containing layer whereto it is applied or when serving as subbing layer may contain latex particles improving the adherence to a gelatin containing layer coated thereto.

In general the coating composition of the covering layer whether it is applied from organic solvent medium or aqueous medium may contain e.g. a matting agent, coating aid and/or friction lowering substance, e.g. a waxe, silicon resin or fluorinated polymer, optionally in particulate form.

A web or sheet according to the invention can incorporate more than one antistatic layer, each such layer incorporating the colloidal silica as defined herein. For example there may be one such antistatic layer on each side of the hydrophobic resin support or resin-coated paper. In that way a particularly high resistance to attraction of dust and sparking can be achieved.

An important use of the above defined antistatic coating is in the manufacture of photographic silver halide emulsion materials having a hydrophobic resin support or hydrophobic resin coated paper support.

Hydrophobic resin supports useful in the manufacture of photographic silver halide emulsion materials are well known to those skilled in the art and are made e.g. of polyester, polystyrene, polyvinyl chloride or polycarbonate, preference being given to polyethylene terephthalate. A preferred resin coated paper support is a poly-Alpha-olefin coated paper support such as a polyethylene coated paper support.

The hydrophobic resin support may be provided with one or more subbing layers known to those skilled in the art for adhering thereto a hydrophilic colloid layer. Suitable subbing layers for polyethylene terephthalate supports are described e.g. in U.S. Pat. Nos. 3,397,988, 3,649,336, 4,123, 278 and 4,478,907.

The sheet or web material provided according to the present invention with the above defined antistatic layer is advantageously used as a support for (a) silver halide emulsion layer(s) forming a photographic silver halide emulsion type material in which the antistatic layer is preferably at the side opposite the silver halide emulsion layer(s).

According to a particular embodiment for counteracting the tendency to curl of said photographic material said water-insoluble synthetic polymer layer is coated with a gelatin containing layer substantially equalizing the tension exerted on the front and rear side of the photographic material after wet processing and drying. That gelatin containing layer may be hardened to some extent to reduce the take up of water and to improve its abrasion resistance. Suitable hardening agents therefor are described e.g. in The Theory of the Photographic Process edited by T. H. James, 4th ed. Macmillan Publishing Co., Inc. New York, p. 77–87.

According to a special embodiment the assemblage of antistatic layer and covering layer of waterinsoluble synthetic polymer is applied between a subbed hydrophobic resin support and a silver halide emulsion layer or assemblage of silver halide emulsion layers and has said covering layer in direct contact with a superposed silver halide emulsion layer.

By the above defined antistatic layer/covering layer assemblage it is possible to reduce the surface resistance of a sheet or web material according to the present invention to a value lower than $10^{10}$ ohm/square at relative humidity (R.H.) of 30%.

The surface resistance expressed in ohm/square (ohm/sq.) is measured by a test proceeding as follows:

—after coating, the resulting antistatic layer is dried and conditioned at a specific relative humidity and temperature. The surface resistance measurement is performed by placing two conductive copper poles having a length of 10 cm parallel to each other at a distance of 1 cm and measuring the resistance built up between said electrodes with a precision ohm-meter.

Photographic silver halide emulsion materials according to the present invention containing an antistatic silica containing layer and adjacent covering layer of waterinsoluble synthetic polymer may be of any type known to those skilled in the art. For example, they may be useful in continuous tone or halftone photography, microphotography and radiography. They can be advantageously used in black-and-white or colour photographic materials including likewise silver complex diffusion transfer reversal (DTR) materials as well as dye diffusion transfer materials on the basis of silver halide emulsion layers.

For the composition of silver halide emulsion layers reference is made e.g. to Research Disclosure 17,643 of December 1978 and Research Disclosure 307,105 of November 1989.

In a particular embodiment of the present invention a silver halide photographic material is provided wherein on the said covering layer at the side opposite the side coated with the silver halide emulsion layer(s) an antihalation layer containing one or more pigments in admixture with a binder, e.g. gelatin is applied. The antireflection substance used in the antihalation coating, e.g. carbon black, may itself have antistatic properties.

Apart from its use in photographic silver halide emulsion materials the antistatic layer/covering layer assemblage may be used in materials serving as image-receiving material in the silver complex diffusion transfer process or in a dye diffusion transfer process as described e.g. in Angew. Chem. Int. Ed. Engl. 22, (1983) p. 191–209.

By using a recording material having an antistatic layer containing the above defined colloidal silica covered with said water-insoluble synthetic polymer covering layer, problems caused by static charges can be avoided or substantially reduced. For example the formation of static charges by contact of a silver halide emulsion layer face with the rear side of the recording material or caused by friction with substances such as rubber and hydrophobic polymeric binder, e.g. the binder constituent of phosphor screens used as X-ray intensifying screens, can be markedly reduced by employing the antistatic layer/covering layer assemblage in accordance with the present invention. The build up of static charges and subsequent dust attraction and/or sparking, e.g. during loading of films in cassettes, e.g. X-ray cassettes, or transport in cameras, e.g. micro-film cameras, and projectors, can be avoided.

Although the above defined antistatic layer/covering layer assemblage is particularly useful in reducing the surface resistance of photographic silver halide emulsion materials it is likewise useful in reducing surface resistance of photographic materials based on diazo-type compositions, vesicular-image forming materials, magnetic recording materials, electrographic or electrophotographic recording materials and mounting or drafting film.

The examples hereinafter set forth are directed to the use of said layer assemblage on a subbed polyethylene terephthalate resin support but other resin bases, e.g. made of polystyrene, polyvinyl chloride or polyethylene either or not being corona-discharge treated and/or subbed with (a) subbing layer(s) for improving the adherence of hydrophilic colloid layers will obtain a strong reduction in surface resistance when coated with the herein described antistatic layer/covering layer assemblage.

The following examples illustrate the present invention without however limiting it thereto.

All percentages and ratios are by weight unless otherwise mentioned.

EXAMPLE 1 (comparative example)

Sample 1 (comparative test sample)

A subbed polyethylene terephthalate support having a thickness of 0.1 mm was coated directly with an antistatic layer from the following coating composition:

| | |
|---|---|
| aqueous dispersion I | 136 ml |
| aqueous dispersion II | 280 ml |
| ULTRAVON W (trade name) | 2 ml |
| ethanol | 100 ml |
| distilled water | 482 ml |

Aqueous dispersion I contains 16.5 g per 100 ml of colloidal silica having a surface area (S.A.) of 500 m$^2$ per g and an average grain size smaller than 7 nm, sold under the trade name KIESELSOL 500 by BAYER A.G.W.-Germany.

Aqueous dispersion II contains 2 g per 100 ml of synthetic hectorite clay sold under the trade name LAPONITE S by LAPORTE INDUSTRIES Ltd. United Kingdom.

ULTRAVON W is the trade name for the disodium salt of 2-heptadecyl-benzimidazole disulfonic acid sold by Ciba A.G. Switzerland, [used here as a 10% solution in a water/ethanol ($^{80}/_{20}$ by volume) mixture].

The coating proceeded at a wet coverage of 140 m$^2$/liter.

Samples 2 to 8 (according to the invention)

The preparation of sample 1 was repeated but onto the dried silica containing layer a covering layer was coated from a solution of polymethylmethacrylate (PMMA) containing 80 g/l in a mixture of acetone/methoxy-1-propanol-2 ($^{80}/_{20}$ by volume). The dry coverage (COV) of PMMA in g/m$^2$ for the samples 2 to 6 is expressed in the following Table 1.

In said Table 1 the surface resistance is given expressed in $10^{10}$×ohm/square of the samples 1 to 6 measured as defined herein at 30% relative humidity and 20° C., before (BP) and after (AP) treating them with classical processing solutions used in development, fixing and rinsing of photographic silver halide emulsion materials. Table 1 contains also a rating value for sticking.

In the sticking test the sample 1 with its silica containing layer and the samples 2 to 6 with their covering layer were conditioned for 3 days at 57° C. at 85% relative humidity in pressure contact (0.05 kg/cm$^2$) with a normally hardened silver halide emulsion layer of a microfilm type recording material. After that period the materials were peeled apart manually and the damage to the outermost layer was given a rating value as follows:

| | |
|---|---|
| no surface damage | 0 |
| up to 25% of the surface damaged | 1 |
| 25 to 50% of the surface damaged | 2 |
| 50 to 75% of the surface damaged | 3 |

| 75 to 100% of the surface damaged | 4 |

TABLE 1

| Sample | COV g/m² | Surface resistance BP | Surface resistance AP | Rating value for sticking |
|---|---|---|---|---|
| 1 | 0 | 0.05 | 1.3 | 4 |
| 2 | 0.05 | 0.07 | 2.3 | 0 |
| 3 | 0.10 | 0.09 | 0.83 | 0 |
| 4 | 0.20 | 0.29 | 0.98 | 0 |
| 5 | 0.50 | 0.93 | 0.32 | 0 |
| 6 | 1.00 | 1.40 | 0.45 | 0 |

The inherent viscosity of a solution containing 0.25 g of the applied PMMA in 50 ml of methylene chloride at 20° C. was 0.18. In the measurement a Cannon-Fenske viscosimeter was used.

When replacing PMMA by poly(isobutylmethacrylate) having an inherent viscosity of 0.64 measured as defined for the PMMA and applying said poly(isobutylmethacrylate) at a dry coverage (COV) of 1.00 g/m² a surface resistance value (BP) of 1.6 and (AP) of 0.2 was obtained. The sticking rating corresponded with value 0.

EXAMPLE 2 (comparative example)

Sample I

A double-side subbed polyethylene terephthalate support was coated at one side with a gelatin-silver bromide-iodide emulsion [AgBr/AgI ($^{99}/_1$ mole %)] at a coverage of silver halide equivalent with 2.06 g of silver nitrate per m2. The gelatin to silver halide ratio was 1.5, the silver halide being expressed as an equivalent amount of silver nitrate. The average grain size of the silver halide was 0.35 μm.

At the side opposite to that of the silver halide emulsion layer an antistatic layer was coated from the same coating composition as described for Sample 1 of Example 1 at the same wet coverage.

Sample II

The preparation of sample I was repeated but onto the dried silica containing layer a covering layer was meniscus coated at 80 m²/l from a 8% solids latex of copoly(vinylidenechloride/methylacrylate/itaconic acid) (88/10/2). The dry coverage (COY) of said latex copolymer was 0.1 g/m².

Sample III

The preparation of sample II was repeated with the difference however that onto the silica containing layer said latex layer was coated from a 32% solids latex at a dry coverage (COV) of 0.4 g/m².

Onto the thus obtained dry covering layer a gelatin containing layer for supressing the tendency to curl of the photographic material was coated from the following composition:

| aqueous silica dispersion K | 30 ml |
| gelatin | 62.5 g |
| ULTRAVON W (trade name) | 2 ml |
| aqueous hardening agent solution U | 20 ml |
| distilled water | 892 ml |

ULTRAVON W is the trade name for the disodium salt of 2-heptadecyl-benzimidazole disulfonic acid sold by Ciba A.G. Switzerland, [used here as a 10% solution in a water/ethanol ($^{80}/_{20}$ by volume) mixture].

Aqueous silica dispersion K contains 36 g per 100 ml of colloidal silica having a surface area (S.A.) of 300 m² per g and an average grain size smaller than 10 nm, sold under the trade name KIESELSOL 300 by BAYER A.G.W.-Germany.

Aqueous hardening solution U contains 4.8 g per 100 ml of dimethylol-urea as gelatin hardening agent.

The anti-curl layer coating composition was coated at a wet coverage of 25 m²/l.

After said coating the material was dried and for allowing the hardening agent to react more thoroughly as it is the case on long duration storage the material was conditioned for 36 hours in an atmosphere of 34% relative humidity at 57° C.

In Table 2 the surface resistance is given expressed in $10^{10}$×ohm/square of the samples I to III measured as defined herein at 30% relative humidity and 20° C., before (BP) and after (AP) treating with classical processing solutions used in development, fixing and rinsing of photographic silver halide emulsion materials.

Table 2 contains also an indication about dust attraction after wet processing and conditioning at 30% relative humidity at 20° C.

In the applied dust attraction test the material was placed on a glass plate and the anti-curl layer side was rubbed with a wool cloth followed by the cascading of dust (ashes of a cigarette) over the rubbed surface.

Dust attraction is indicated by (+) and absence of dust attraction is indicated by (−).

TABLE 2

| Sample | COV g/m² | Surface resistance BP | Surface resistance AP | Dust attraction |
|---|---|---|---|---|
| I | 0 | 89 | 130 | + |
| II | 0.1 | 1.0 | 14 | − |
| III | 0.4 | 1.3 | 40 | − |

We claim:

1. A sheet or web material being a subbed or unsubbed hydrophobic resin support or paper support coated with at least one hydrophobic resin layer and having in direct contact therewith at least on one side thereof an antistatic layer containing for at least 70% by weight colloidal silica having an average particle size not larger than 10 nm and a surface area of at least 300 m² per gram, the colloidal silica being present in said antistatic layer at a coverage of at least 50 mg per m² characterized in that said antistatic layer is coated with a covering layer having a smaller sticking power to a gelatin layer than said silica containing layer, said covering layer being applied as an organic solvent composition containing at least 50% by weight of a water-insoluble synthetic polymer and having a dry coverage in the range of 0.01 to 2 g/m².

2. A sheet or web material according to claim 1, wherein said covering layer is applied at a dry coverage in the range of 0.05 to 1 g/m².

3. A sheet or web material according to claim 1, wherein the colloidal silica bas a surface area of 500 m2 per gram and an average grain size smaller than 7 nm.

4. A sheet or web material according to claim 1, wherein the coverage of said colloidal silica is in the range of 100 mg to 500 mg per m2.

5. A sheet or web material according to claim 1, wherein said antistatic layer is coated from an aqueous dispersion of the colloidal silica in the presence of a surface-active agent.

6. A sheet or web material according to claim 1, wherein said antistatic layer contains colloidal silica in the presence of an anionic surface-active agent.

7. A sheet or web material according to claim 1, wherein said antistatic layer contains colloidal silica in the presence of a non-ionic surface-active agent.

8. A sheet or web material according to claim 1, wherein in said antistatic layer the weight ratio of colloidal silica to surface-active agent is in the range from $5/1$ to $200/1$.

9. A sheet or web material according to claim 1, wherein said support is a polyester resin support.

10. A sheet or web material according to claim 1, wherein said antistatic layer contains colloidal silica in the presence of a synthetic hectorite clay.

11. A sheet or web material according to claim 10, wherein in the antistatic layer the synthetic hectorite clay is present in admixture with the colloidal silica in a weight ratio in the range of $1/20$ to $1/4$.

12. A sheet or web material according to claim 1, wherein said polymer is selected from the group consisting of polymethylmethacrylate, polyisobutylmethacrylate, polycarbonate, mixed polyester-carbonate and a polycarbonate/polystyrene blend.

13. A sheet or web material according to claim 1, wherein a coating composition for said covering layer contains a matting agent, coating aid and/or friction lowering substance.

14. A sheet or web material according to claim 1, wherein said material is a photographic material containing (a) silver halide emulsion layer(s) on a subbed hydrophobic resin support or hydrophobic resin coated paper support.

15. A sheet or web material according to claim 14, wherein said antistatic layer is present at the side of the hydrophobic resin support opposite the side coated with the silver halide emulsion layer(s).

* * * * *